April 21, 1959  R. E. DORENBOS  2,882,590
MOTOR FRAME ASSEMBLY PRESS
Filed Nov. 18, 1954  6 Sheets-Sheet 1

INVENTOR.
Richard E. Dorenbos
BY
Walter L. Schlegel, Jr. Atty

April 21, 1959 — R. E. DORENBOS — 2,882,590
MOTOR FRAME ASSEMBLY PRESS
Filed Nov. 18, 1954 — 6 Sheets-Sheet 3

INVENTOR.
Richard E. Dorenbos
BY
Walter L. Schlegel, Jr. Atty.

April 21, 1959  R. E. DORENBOS  2,882,590
MOTOR FRAME ASSEMBLY PRESS
Filed Nov. 18, 1954  6 Sheets-Sheet 4
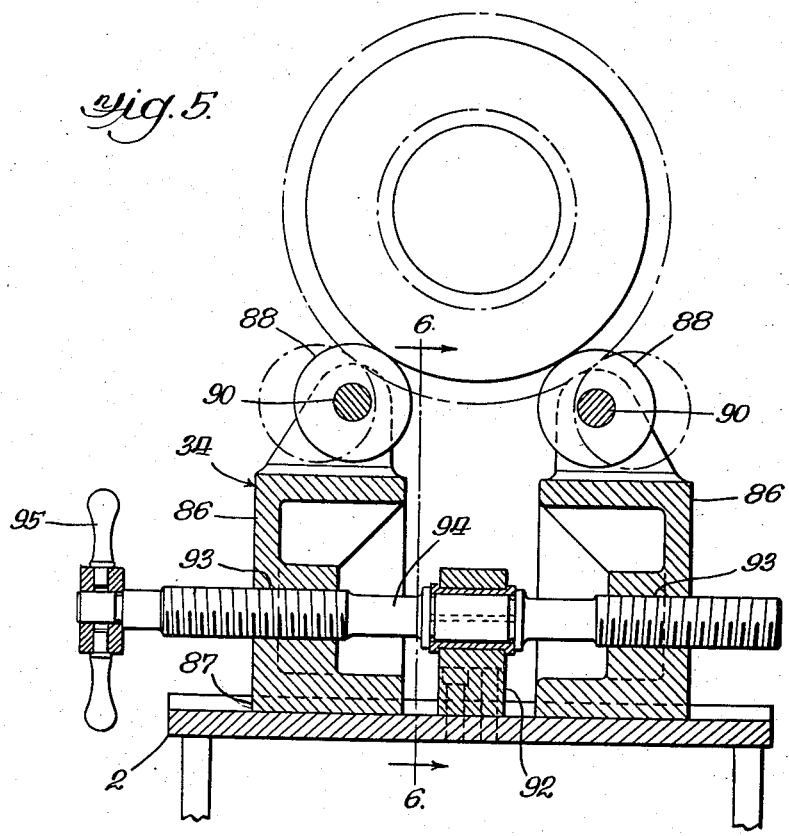
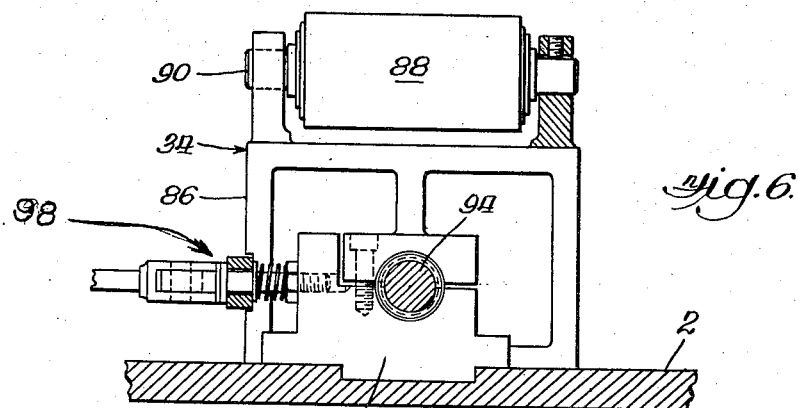
INVENTOR.
Richard E. Dorenbos
BY
Walter L. Schlegel, Jr. Atty.

April 21, 1959 R. E. DORENBOS 2,882,590
MOTOR FRAME ASSEMBLY PRESS
Filed Nov. 18, 1954 6 Sheets-Sheet 5

INVENTOR.
Richard E. Dorenbos
BY
Walter L. Schlegel Jr. Atty.

April 21, 1959  R. E. DORENBOS  2,882,590
MOTOR FRAME ASSEMBLY PRESS
Filed Nov. 18, 1954  6 Sheets-Sheet 6

INVENTOR.
Richard E. Dorenbos
BY
Walter L. Schlegel, Jr. Atty.

United States Patent Office 2,882,590
Patented Apr. 21, 1959

2,882,590
MOTOR FRAME ASSEMBLY PRESS

Richard E. Dorenbos, Greenhills, Ohio, assignor to American Steel Foundries, Chicago, Ill., a corporation of New Jersey Application November 18, 1954, Serial No. 469,638

3 Claims. (Cl. 29—205)

The invention relates to press equipment and more particularly to a novel motor frame assembly press which facilitates the assembly of a stator to a frame on electric motors.

Heretofore in the art, electric stators when applied to a motor frame, were positioned in the frame manually or with the help of certain assembly fixtures and maintained in assembled position within the frame by utilizing keys between the stator and the frame or other similar conventional locking devices. The instant invention comprehends the assembly of a stator to a motor frame, and the utilization of an interference fit therebetween to maintain the frame and stator in assembled relation thereby doing away with keys or other fastening devices heretofore employed.

Particularly the invention comprehends a novel assembly press and fixtures associated therewith to accomplish the assembling operation whereby the stator is quickly, easily and accurately assembled to the motor frame.

Accordingly, it is a primary object of the invention to provide an assembly press readily adapted to assembling a stator to a motor frame, wherein the stator is arranged to have an interfering fit relative to the frame.

It is a particular object of the invention to provide a press of the type described wherein a movable ram engages, centers, and moves a stator toward a mounted motor frame and deposits the stator within the frame to complete the working stroke.

It is an additional specific object of the invention to provide the ram on a press of the type described with a novel centering arrangement that accurately positions the long axis of the stator in alignment with the long axis of the motor frame to facilitate the operation.

It is an additional specific object of the invention to provide a press of the type described with facilities that readily accommodates stator and motor frames of varying sizes whereby the machine may be used for assembly operation throughout a wide range of electric motors.

These and other objects of the invention will become apparent in the course of the following description and from an examination of the concerned drawings, wherein.

Figure 1:
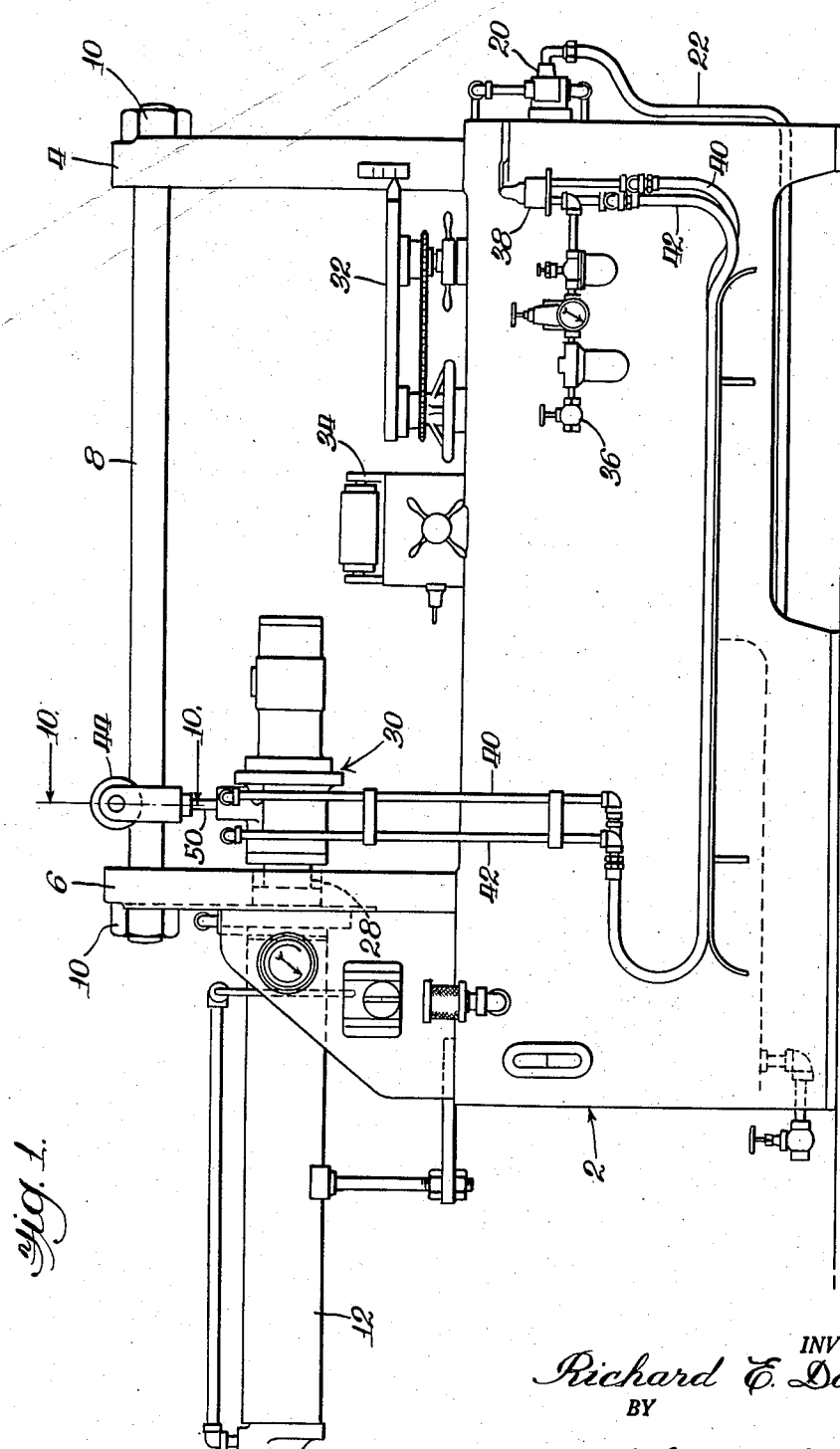
Figure 1 is a side elevational view of a machine of the type described.
Figure 2:
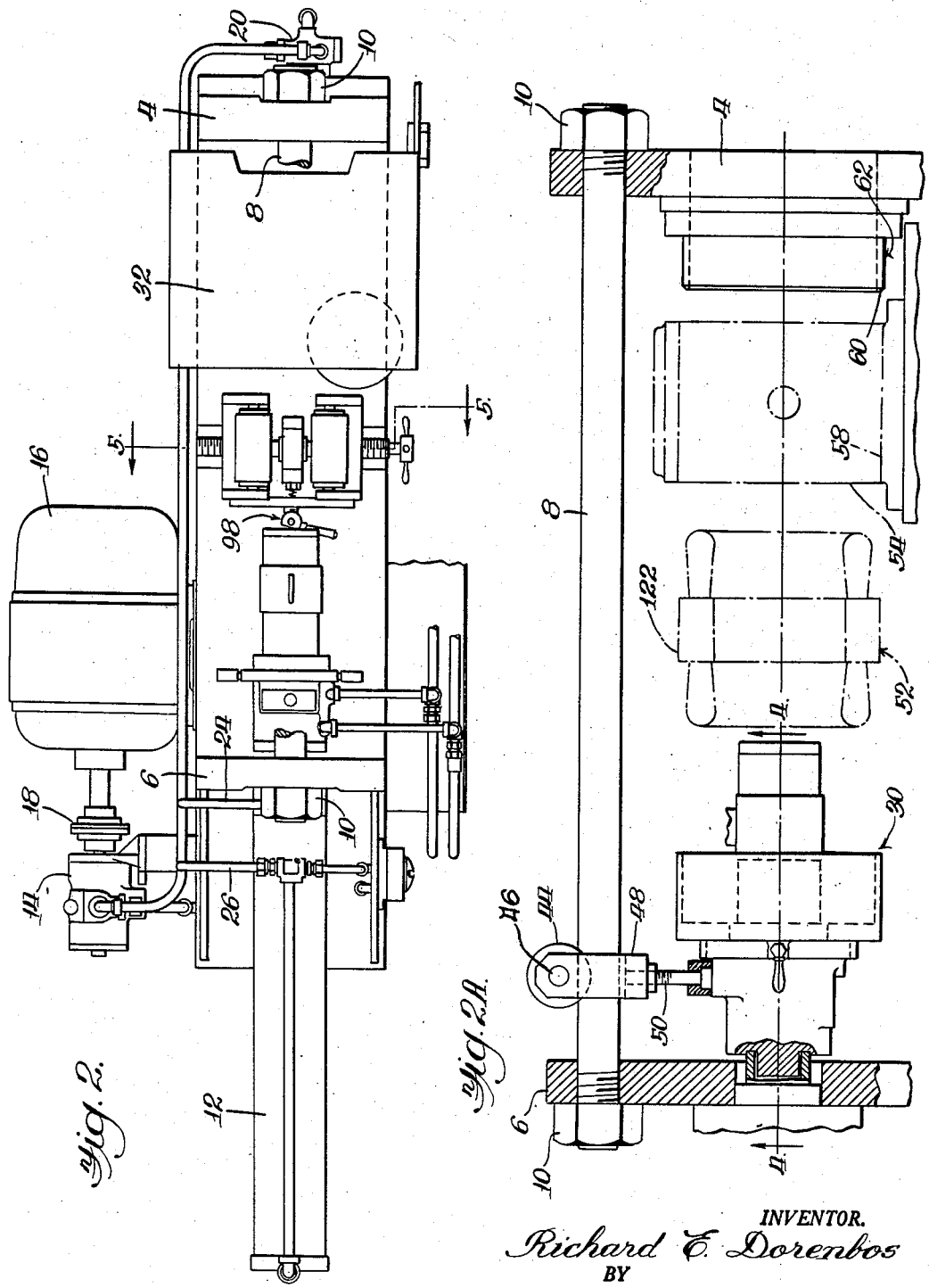
Figure 2 is a plan view of the structure shown in Figure 1.
Figure 3:
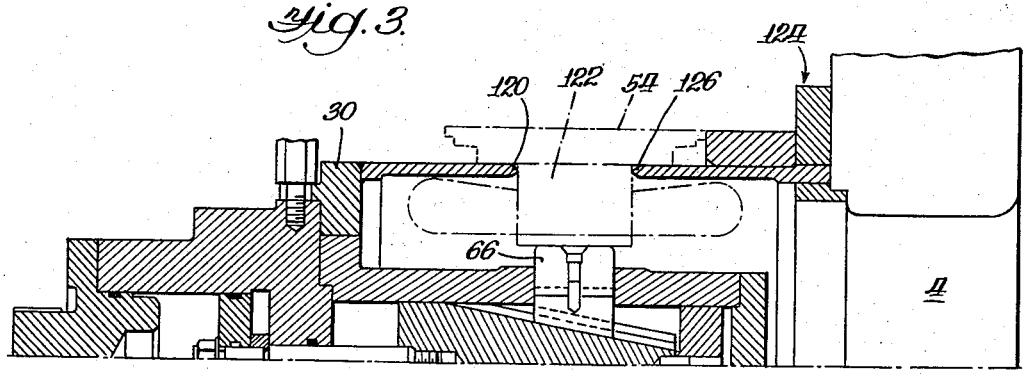
Figure 4:
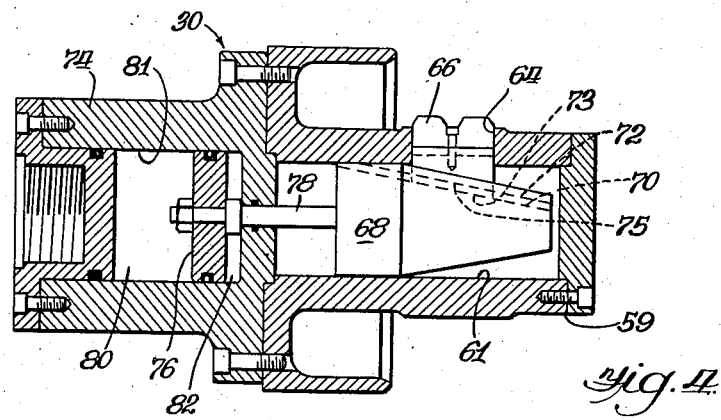
Figure 4A:
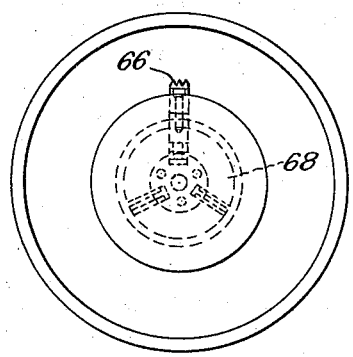
Figure 7:
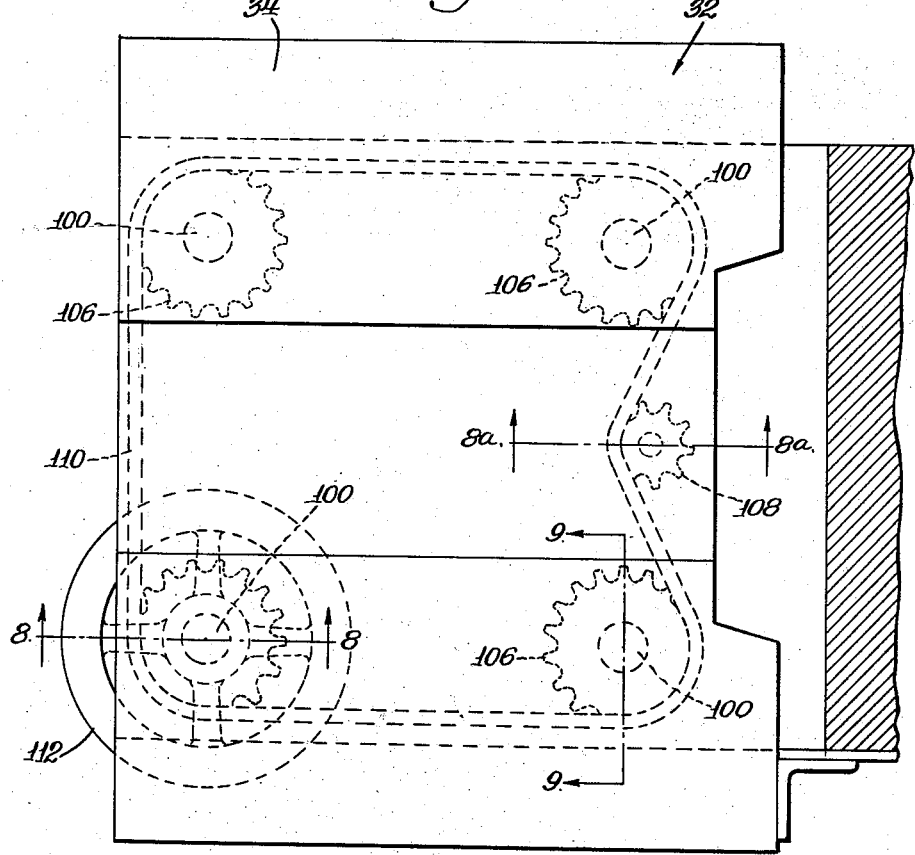
Figure 10:
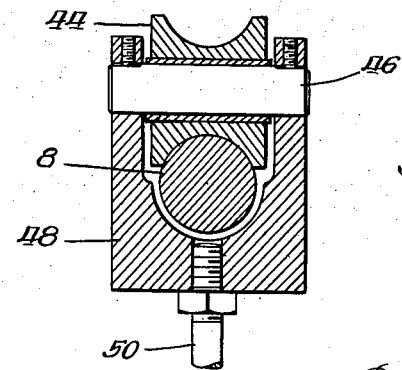
Figure 8:
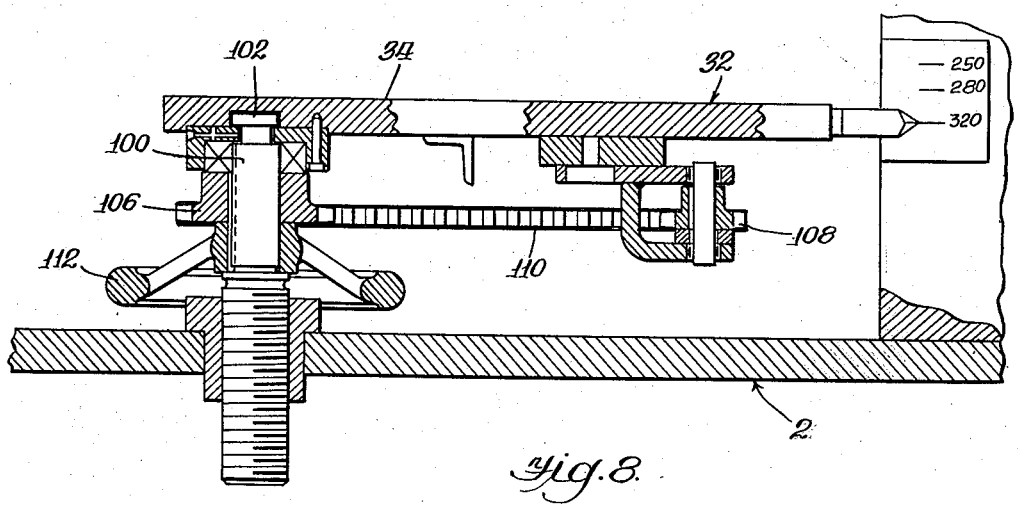
Figure 9:
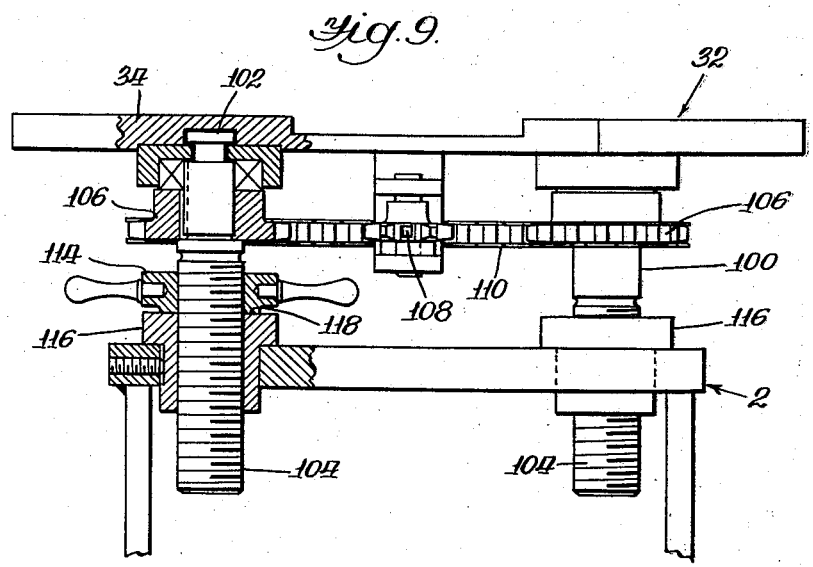

Figure 2a is a fragmentary side elevational view, partly in section, illustrating the operating members of the arrangement, Figure 3 is a fragmentary sectional view illustrating the machine at stroke completion wherein the stator has been assembled to the frame, Figure 4 is a fragmentary sectional view taken along lines 4—4 of Figure 2a, Figure 4a is an end view of the ram showing particularly the spacing of the jaws, Figure 5 is a sectional view of the stator support assembly taken along line 5—5 of Figure 2, Figure 6 is a fragmentary sectional view taken along line 6—6 of Figure 5, Figure 7 is a fragmentary top plan view of the frame supporting table associated with the machine, Figure 8 is a fragmentary side elevational view of the frame supporting table having partial sections taken along lines 8—8 and 8a—8a of Figure 7, Figure 9 is a fragmentary end elevational view of the frame supporting table with a fragmentary section taken along line 9—9 of Figure 1, and Figure 10 is a sectional view taken along lines 10—10 of Figure 1.

Describing the invention in detail and directing attention first to Figure 1, it will be seen that the motor frame assembly press comprises a base 2, which offers support for the entire arrangement. At one end of the base 2 an upwardly projecting resistance head 4 is rigidly mounted. At the opposite end of the base 2 an upwardly projecting ram supporting head 6 is rigidly mounted. A guiding bar 8 interconnects the heads 4 and 6 at the upper extremities thereof, said guiding bar being fixedly secured in position by the nuts 10, 10. The guiding bar 8 is additionally ground finished and preferably cylindrical in section (not shown), whereby it may offer an accurate support for the operating parts of the press as will hereinafter be more fully described.

An operating cylinder 12, preferably a hydraulic cylinder, is mounted on the outboard side of the head 6 and is arranged to be longitudinally aligned relative to the entire press. The cylinder 12 is preferably hydraulically actuated by hydraulic fluid furnished by a pump 14 mounted on the rear side of the press, said pump being energized or operated by a motor 16 mounted on the rear side of the press adjacent the pump 14 and having a mechanical coupling therebetween as at 18. The pump 14 delivers hydraulic fluid to a four-way ram control valve 20 via line 22, and preferably mounted on the right hand side of the press. The valve 20 is provided with a plurality of exhaust lines 24 and 26, said exhaust lines going respectively to the forward and reverse side of the operating cylinder 12.

A connecting rod 28 projects from one side of the cylinder 12 and is connected internally of the cylinder to an operating piston (not shown) as is conventional in the art. The rod 28 is rigidly connected at its outboard extremity to a ram or a ram head 30, said ram head being located above the bed 2 and intermediate the heads 4 and 6. The control valve 20 may be operated whereby the ram 30 is urged to move linearly between the heads 4 and 6 through a working stroke.

A motor frame table 32 is mountetd on the bed 2 adjacent the resistance head 4. Intermediate the motor table 32 and the head 6, a stator support assembly 34 is mounted through the bed 2, said stator support assembly being preferably located intermediate the table 32 and the ram 30 when the ram is in return position as is illustrated in Figure 1. A source of pneumatic pressure (not shown) is connected at 36 to certain operating features of the press, said pneumatic pressure being controlled by a four-way valve 38 which alternately directs the pressure to lines 40 and 42, said lines being connected to an operating mechanism in the ram head 30 as will hereinafter be more fully explained. A yo-yo or pulley type guide roller 44 is provided to engage the guide bar 8 as is best shown in the sectional view of Figure 10. The roller 44 is pivotally mounted on a pin 46, which in turn is mounted in a block 48, said block having a fixed connection via the bar 50 to the ram 30.

Directing attention now to Figure 2a, which illustrates certain operating features of the invention in detail, it will be seen that a stator, indicated in phantom at 52, is positioned on the stator support assembly, the long axis of the stator paralleling the longitudinal axis of the bed 2. A motor frame, indicated in phantom at 54, is mounted on the motor frame table 32 immediately adjacent the stator 52. When the ram is actuated, forwardly toward the stator 52, the forward portion of the ram inserts itself within the hollow aperture on the inside of the stator 52. The ram 30 then picks up the stator 52 and carries it forwardly toward the frame 54 urging the stator inside a cylindrical aperture 58 formed in the frame 54. The ram additionally carries the stator 52 and the engaged motor frame 54 to the right until the edge of the stator central strap 122 engages an abutment 60 provided on a fixture 62 mounted on the left side of the resistance head 4. At this point, the stator is completely assembled with an interfering fit within the motor frame 54.

Directing attention to Figures 4 and 4a, it will be seen that the ram 30 comprises a front housing 59, said housing presenting a cylindrical hollow 61 therein. A plurality of apertures 64 are radially arranged relative to the long axis of the cylinder 12, said aperture 64 having a plurality of jaws 66 disposed for movement radially relative to the long axis of the cylinder. A movable member 68 is disposed within the hollow 61, said movable member having tapered surfaces 70 or 72, which converge on the axis of the hollow 61 and are in T-slot complemental engagement with tapered surfaces 73 formed on the respective jaws 66. A base section 74 is rigidly mounted rearwardly of the housing 59 and securely attached thereto. The base section 74 has a cylindrical hollow 81 formed thereon with a piston 76 movably disposed in the hollow. A piston rod 78 rigidly interconnects the piston 76 and movable member 68. It will be noted that the piston 76 divides the hollow 81 in the section 74 into advance and return chambers 80 and 82 respectively. The line 42 coming from the four-way pneumatic control valve 38 is arranged to communicate with the advance chamber 80 while the line 40 coming from the control valve 38 communicates with the return chamber 82 as will be well understood by those skilled in the art. Upon actuation of the control valve 38, air pressure may be admitted to the chamber 80 urging the piston forwardly which in turn causes forward movement of the member 68. Forward movement of the member 68 causes the jaws 66 to move outwardly of the housing 59. Upon moving the control valve 38 to another position, the air is exhausted from the advance chamber and directed to the return chamber urging the piston rearwardly as seen in Figure 4, whereby the member 68 is carried rearwardly and the jaws 66 are urged inwardly toward the axis of the housing 59.

Directing attention to Figures 5 and 6, it will be seen that the stator support assembly 34 comprises a plurality of upstanding supports 86, 86. The supports 86 are keyed to the bed 2 as at 87 at the lower end thereof, the axis of the keys extending transversely of the bed 2. At their upper extremities, the supports 86 each carry a roller 88, the rollers 88 being pivotally supported by pins 90 having their axis extending longitudinally of the bed. Centrally of the bed and intermediate the supports 86, a journal 92 is provided, said journal 92 rotatably carrying an operating bar 94. The portions of the bar 94 on opposite sides of the journal 92 threadably engage the respective supports 86, 86 as at 93, 93. An operating handle 95 is provided at one end of the bar 94, whereby the bar may be rotated and the supports 86 and the carried rollers 88 may be moved toward and away from each other. A locking mechanism is indicated at 98, said locking mechanism serving to move the journal 92 whereby the bar 94 is frictionally engaged at the journal in order to prevent accidental rotation of the bar 94.

Directing attention to Figures 7 through 9, it will be seen that the motor frame supporting table 32 comprises a flat table 34 having four legs 100 depending therefrom. As seen in Figure 8, each leg 100 is in T-slot rotatable engagement as at 102 with the table 32, and the lower ends of the legs 100 are threadably mounted as at 104 in the bed 2 of the press. Intermediate the table and the bed, each leg 100 has a sprocket 106 keyed thereto. An idling sprocket 108 is provided on the table and centrally thereof in order to maintain proper tension in a chain 110, said chain 110 being operatively associated with the several sprockets 106. One of the legs 100 has an adjusting wheel 112 keyed thereto. Upon manual rotation of the adjusting wheel 112, the related sprocket 106 is rotated concurrently with rotation of the wheel 112. This movement is carried to the other four legs 100 via the interconnecting chain 110 whereby the table is urged to move upwardly or downwardly a determined amount depending upon the amount of rotation of the wheel 112. As best seen in Figure 9, one of the legs 100 is provided with a locking nut 114, said locking nut threadably engaging the threaded portion 104 of the leg 100. When the table has been raised or lowered to the desired position, the locking nut 114 may be conveniently rotated until it is in tight engagement with the top of the bed mounted bushing 116 as at 118, thereby locking the leg in fixed position and preventing accidental rotation thereof and assuring that the table will maintain the selected position.

Considering the general operation of the motor frame assembly press, an operator first locates a motor frame 54 in position on the motor frame table support 32. A stator is then positioned on the rollers of the stator roll support assembly 34. At this point the frame is in alignment with the line of action of the movable ram and the stator roll is in approximate alignment with the line of action. The operator then operates the four-way control valve 20 whereby hydraulic fluid is admitted to the cylinder 12 and the ram 30 is urged to move forwardly toward the stator. As the housing 59 of the ram 30 enters the stator, the abutment 120 of the ram 30 engages the central strap 122 of the stator and the operator actuates the four-way control valve 38 to admit pneumatic pressure to the advance chamber 80 of the ram 30, whereby the jaws 66 are urged to move outwardly relative to the longitudinal axis of the advance portion 59 and engage the inner periphery of the stator. Inasmuch as the several jaws 66 move concurrently and inasmuch as three jaws are used to engage the inner periphery of the stator roll, the jaws 66 have the effect of centering the stator roll accurately relative to the line of action of the ram 30. The operator then moves the four-way control valve 20 to a neutral position halting movement of the ram 30. The operator then manually feeds the stator leads into the aperture 58 and out conduit opening in motor frame 54. He then again actuates the control valve 20 and the cylinder 12 continues the forward motion of the ram and carried stator.

Directing attention to Figure 3, it will be seen that an abutment 120 on ram 30 engages the central strap 122 of the stator while the jaws 66 engage the inner periphery of the stator. As the ram 30 is moved forwardly, the stator 52 is pressed into the motor frame 54, the tolerance between the stator central strap 122 and the internal diameter 58 of the frame 54 being such as to afford an interfering fit therebetween. A fixture 62 is mounted on the resistance head 4 of the press, said fixture comprising a cylindrical abutment 60 arranged to engage the opposite side of the center strap 122 of the stator 52 when the stator is properly located within the frame 54. Figure 3 illustrates the motor frame 54 and center strap 122 when assembly has been completed and the ram has passed through its complete stroke.

At this point the operator actuates control valve 38 whereby pneumatic pressure is exhausted from advance chamber 80 and admitted to return chamber in the ram 30. This of course causes the jaws 66 to retract in the manner heretofore explained. The control valve 20 may then be actuated to direct hydraulic fluid to the return chamber to the operating cylinder 12, whereby the ram

I claim:

1. In a machine for assembling a hollow stator into a motor frame, the combination of: a bed; a linearly movable ram mounted on the bed; stator support means arranged to carry a hollow stator in alignment with the line of action of the ram; frame support means carried by the bed and disposed adjacent the stator support means opposite the ram, said frame support means being arranged to carry a motor frame in alignment with the line of action of the ram; power means to move the ram; said ram having a portion thereon arranged to telescope into the hollow stator upon ram movement in a given direction; means in said portion for centering the stator relative to the ram line of action; abutment means on the ram to engage the stator for moving the latter in said direction into assembled relationship with the motor frame; and means for actuating said centering means when said portion is disposed within the stator and for releasing said centering means after said stator is assembled within the motor frame.

2. In a machine for assembling a hollow stator into a motor frame, the combination of: a bed; a linearly movable ram mounted on the bed; stator support means arranged to carry a hollow stator in alignment with the line of action of the ram; frame support means carried by the bed and disposed adjacent the stator support means opposite the ram, said frame support means being arranged to carry a motor frame in alignment with the line of action of the ram; power means to move the ram; said ram having a portion thereon arranged to telescope into the hollow stator upon ram movement in a given direction; means in said portion for centering the stator relative to the ram line of action, said centering mechanism comprising a plurality of locking members movable radially of the ram line of action for engagement with the internal periphery of the stator, a movable element having a plurality of tapering T-slots for complementally receiving said locking members, and means for moving said element to thereby impart said radial movement to said locking members; abutment means on the ram to engage the stator for moving the latter in said direction into assembled relationship with the motor frame; and means for actuating said centering means when said portion is disposed within the stator and for releasing said centering means after said stator is assembled within the motor frame.

3. In a machine for assembling a hollow stator into a motor frame, the combination of: a bed; a linearly movable ram mounted on the bed; stator support means arranged to carry a hollow stator in alignment with the line of action of the ram; frame support means carried by the bed and disposed adjacent the stator support means opposite the ram, said frame support means being arranged to carry a motor frame in alignment with the line of action of the ram; power means to move the ram; said ram having a portion thereon arranged to telescope into the hollow stator upon ram movement in a given direction; means in said portion for centering the stator relative to the ram line of action, said centering means being the sole means of support for the stator; abutment means on the ram to engage the stator for moving the latter in said direction into assembled relationship with the motor frame; and means for actuating said centering means when said portion is disposed within the stator and for releasing said centering means after said stator is assembled within the motor frame.

References Cited in the file of this patent

UNITED STATES PATENTS

| Number | Name | Date |
|---|---|---|
| 504,031 | Gordon | Aug. 29, 1893 |
| 799,229 | Fildes | Sept. 12, 1905 |
| 937,990 | French | Oct. 26, 1909 |
| 1,090,920 | Knight | Mar. 24, 1914 |
| 1,601,321 | Picos | Sept. 28, 1926 |
| 1,677,860 | Ferris | July 17, 1928 |
| 1,707,905 | Debyshire | Apr. 2, 1929 |
| 1,859,920 | Haskins | May 24, 1932 |
| 2,177,231 | Tinnerman | Oct. 24, 1939 |
| 2,188,433 | Friese | Jan. 30, 1940 |
| 2,312,914 | Koszegny | Mar. 2, 1943 |
| 2,353,774 | Wagner | July 18, 1944 |
| 2,390,170 | Poole | Dec. 4, 1945 |
| 2,500,204 | Ronay | Mar. 14, 1950 |
| 2,676,391 | Elder | Apr. 27, 1954 |